March 19, 1929.  G. HILGER  1,706,230

VALVE

Filed May 20, 1927

Inventor
George Hilger
By Chindahl, Parker & Carlson
Attys

Patented Mar. 19, 1929.

1,706,230

UNITED STATES PATENT OFFICE.

GEORGE HILGER, OF CHICAGO, ILLINOIS.

VALVE.

Application filed May 20, 1927. Serial No. 192,822.

My invention relates generally to valves and more specifically to a pressure reducing valve of the constant pressure type.

It is customary to use such a valve in mechanical refrigeration systems for the purpose of maintaining a predetermined pressure in the feed line leading to the cooling coil.

In the valves of this type the valve operating means usually comprises a pressure responsive diaphragm mounted in the valve casing in such a manner that its inward movement will open the valve. The inward and outward movement of such a diaphragm is necessarily very limited so that with the ordinary valve, the initial movement of the diaphragm opens a large portion of the total available valve orifice, and a continued movement of the diaphragm does not increase the opening in proportion to the movement of the diaphragm. It has been found that the use of a valve which opens gradually will tend to keep the feed line pressure more uniform. It is the object, therefore, of my invention to provide a novel valve of this type in which the effective valve opening is increased and decreased more gradually than has been possible in valves heretofore used.

Another object is to provide a valve in which the wear is distributed over a plurality of valve seats formed therein.

Other objects and advantages will become apparent from the following description and from the accompanying drawings in which.

Figure 1:
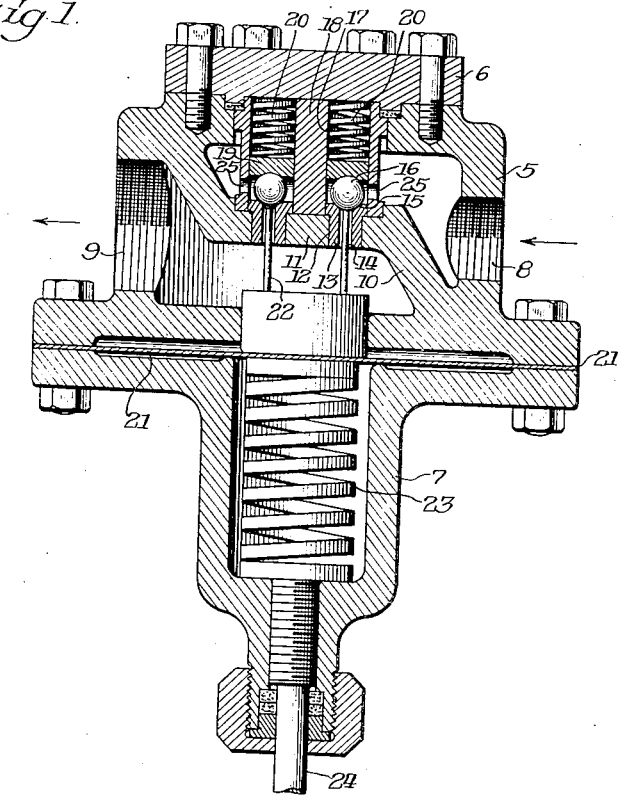
Figure 1 is a vertical sectional view of a valve embodying my invention, the section being taken along the line 1—1 of Fig. 2.
Figure 2:
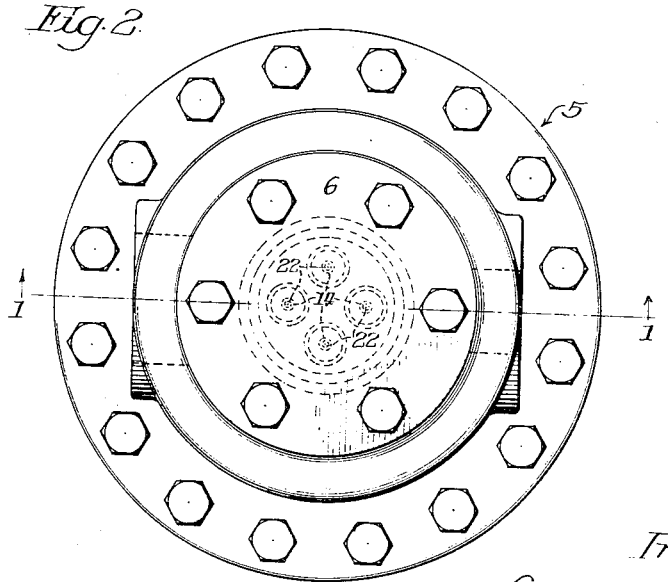
Fig. 2 is a plan view of the valve shown in Fig. 1.

Although the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

Referring more specifically to the drawings, my novel valve comprises a casing 5 closed at its upper side by a plate 6 and at its lower side by a housing 7. The casing 5 is provided with inlet and outlet openings, such as threaded bores 8 and 9, and has an internal wall 10 which serves to divide the casing 5 into inlet and outlet compartments. The wall 10 preferably has an offset portion 11 which is substantially parallel to the top plate 6 of the casing 5. A plurality of openings 12 are formed in the offset portion 11 of the wall 10, these openings serving to receive bushings 13, in which are formed valve apertures or orifices 14, and valve seats 15. The valve orifices are closable by means of valve members 16, which are complementary to valve seats 15, and which are movable within bores 17 formed in a cage member 18. The cage member 18 is mounted between the offset portion of the wall 10 and the upper wall of the casing 5, preferably in such a manner that the valve members 16 may be moved axially away from the orifices 14. In the present embodiment the valve members 16 are each normally urged to their closed position by a piston 19 mounted in each bore 17, the piston being urged by an expansive spring 20 which is also mounted in the bore 17.

A pressure responsive diaphragm 21 is provided, mounted in the casing 5 in any preferred manner such as by clamping between the casing 5 and the housing 7, said diaphragm having a plurality of pins 22 mounted on its upper face, the purpose of which will appear hereinafter. Any preferred means may be provided to exert an inward pressure upon the diaphragm, such as an expansive coil spring 23 mounted within the housing 7, the pressure of this spring being variable by means of a longitudinally adjustable plunger 24 which extends through the bottom of the housing 7. The pins 22 extend longitudinally through the valve orifices 14 so that by a continued upward movement they will engage the valve members 16 to open the valves. The pins are of different lengths, so that the valve members 16 will be engaged and opened successively during an upward movement of the diaphragm 21, and closed successively during the downward movement of the diaphragm.

Apertures 25 are provided in the cage member 18 to allow the passage of fluid into the bores 17 and then through the valve orifices 14 when the valves are opened.

In operation, the valve orifices 14 will be closed when the pressure in the feed line is sufficient to move the diaphragm 21 downwardly against the upward pressure of the spring 23. When this pressure becomes less than that of the spring 23, the diaphragm 21 will be moved upwardly so that the one of the pins 22 will engage its corresponding valve member 16 and open its valve orifice 14. If the pressure within the feed line continues to fall, the diaphragm 21 will continue its upward movement so that the pins 22 will engage the valve members 16 and open the valve orifices 14 in succession. Fluid will then flow through the valve orifices which are open and will build up the pressure in the feed line until it is sufficient to overcome the pressure of the spring 23 and move the diaphragm 21 and pins 22 downwardly so as to allow the valves to close in succession.

Thus it will be apparent that I have provided a valve which will by the successive opening of a plurality of orifices, gradually increase the effective valve opening during the continued movement of the operating means. It will also be apparent that the wear caused by the rapid passage of fluids will be distributed over the plurality of valve orifices which are provided.

I claim as my invention:

1. In a valve, a casing having an outer wall and a division wall, said outer wall having an opening therethrough, a multiple valve device comprising a cage member fitted in said opening in the outer wall, a cap plate between which and said division wall said cage is secured, said cage providing a plurality of valve chambers closed at their outer ends by said cap plate and each having a valve member therein with seats therefor, and spring means acting to hold the valve members to their seats.

2. In a constant pressure reducing valve, a casing having opposing outer walls and a division wall therebetween having a plurality of valve openings therein, a multiple valve device positioned between the division wall and one outer wall comprising a cage member removable through said outer wall and having a plurality of valve members therein movable toward said division wall to close said valve openings, individual springs within said cage member pressing said valves toward closed position, a diaphragm positioned outside of said other outer wall, a housing securing said diaphragm in place, a spring in the housing urging said diaphragm inwardly toward said wall, and a plurality of pins of different lengths mounted on said diaphragm and extending into said casing and through said valve openings so that they may contact said valve members to open the same successively against the action of said individual springs.

3. In a constant pressure reducing valve, a casing with opposing outer walls and a division wall therebetween having a plurality of openings therein, valve means including a plurality of valve members positioned between said division wall and one outer wall and movable toward said division to close said valve openings and a plurality of individual springs one urging each of said valve members toward closed position, said valve means being removable through said outer wall, and control means positioned on the opposite side of said division wall comprising a spring expansible toward said division wall, a diaphragm, and a plurality of pins mounted on said diaphragm and extending through said valve openings so that they may be urged by said control spring into contact with said valve members to open the same successively against the action of said individual springs.

In testimony whereof, I have hereunto affixed my signature.

GEO. HILGER.